(12) United States Patent
Endou (10) Patent No.: US 8,255,920 B2
(45) Date of Patent: Aug. 28, 2012

(54) TIME MANAGEMENT CONTROL METHOD FOR COMPUTER SYSTEM, AND COMPUTER SYSTEM

(75) Inventor: Shin Endou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 972 days.

(21) Appl. No.: 12/230,504

(22) Filed: Aug. 29, 2008

(65) Prior Publication Data

US 2009/0007136 A1   Jan. 1, 2009

Related U.S. Application Data

(63) Continuation of application No. PCT/JP2006/303910, filed on Mar. 1, 2006.

(51) Int. Cl.
*G06F 9/455* (2006.01)
*G06F 9/46* (2006.01)

(52) U.S. Cl. ............... 718/105; 718/1; 718/100

(58) Field of Classification Search ............ 718/1, 100, 718/105
See application file for complete search history.

(56) References Cited

U.S. PATENT DOCUMENTS

| | | | |
|---|---|---|---|
| 6,598,012 B1 * | 7/2003 | Berry et al. | 702/187 |
| 6,941,519 B1 * | 9/2005 | Jerome et al. | 715/744 |
| 6,973,517 B1 * | 12/2005 | Golden et al. | 710/104 |
| 7,155,629 B2 | 12/2006 | Lange-Pearson et al. | |
| 2002/0147944 A1 * | 10/2002 | Clegg et al. | 714/45 |
| 2004/0205368 A1 | 10/2004 | Lange-Pearson et al. | |

FOREIGN PATENT DOCUMENTS

| | | |
|---|---|---|
| JP | 11-15558 | 1/1999 |
| JP | 2000-020158 | 1/2000 |
| JP | 2003-36123 | 2/2003 |
| JP | 2004-318878 | 11/2004 |

OTHER PUBLICATIONS

International Search Report for PCT/JP2006/303910, mailed Apr. 4, 2006.

* cited by examiner

*Primary Examiner* — Thomas Lee
*Assistant Examiner* — Samantha Hoang
(74) *Attorney, Agent, or Firm* — Fujitsu Patent Center (57) ABSTRACT

In a time management control method of a computer system for managing each individual time of a plurality of virtual systems, a service process or retains an overall system time and a difference time between the overall system time and a virtual system time for each virtual system, and a firmware in the virtual system acquires the overall system time and the difference time, calculates a difference time between the overall system time and the change time of the virtual system, adds the both difference times, and informs the service processor. Accordingly, the virtual system time can be changed without time management hardware in each virtual system. Further, since service processor performs update processing only, it is also possible to prevent a time set error caused by delayed calculation processing etc.

4 Claims, 6 Drawing Sheets

TIME MANAGEMENT CONTROL METHOD FOR COMPUTER SYSTEM, AND COMPUTER SYSTEM

CROSS REFERENCE TO RELATED APPLICATIONS

This application is a continuation of International Application No. PCT/JP2006/303910, filed on Mar. 1, 2006, now pending, herein incorporated by reference.

FIELD OF THE INVENTION

The present invention relates to a time management control method and a computer system to manage each individual system by a mutually different time in the computer system constituted of a plurality of independent systems, and more particularly a time management control method and a computer system to reduce hardware for managing time of the overall system.

BACKGROUND ARTS

In recent years, as a computer system becomes larger in scale, the use thereof is diversifying. A large-scale system has resources such as a plurality of system boards, a plurality of CPUs, a plurality of memories, and a plurality of HDDs (hard disk drives).

In addition to the use of such a large-scale system by operating a single virtual system using full resources, there is an increased use of a plurality of systems by dividing the large-scale system into a plurality of individual virtual systems, with necessary resources assigned to each.

To above systems which are independently operated, it is required to independently perform time management without being affected by other systems. Even when the single large-scale system is divided into the plurality of virtual systems, it is required to manage an operating time on the basis of each individual independent system.

However, each divided virtual system is no more than a system in which the resources of the large-scale system are assigned virtually, and it is not possible to mount time management hardware (clock timer) to each system. Therefore, it is required to incorporate a unit for managing the time of each individual virtual system, into a unit called a service processor (hereafter described as SP) for managing the large-scale system as a whole.

Figure 8:
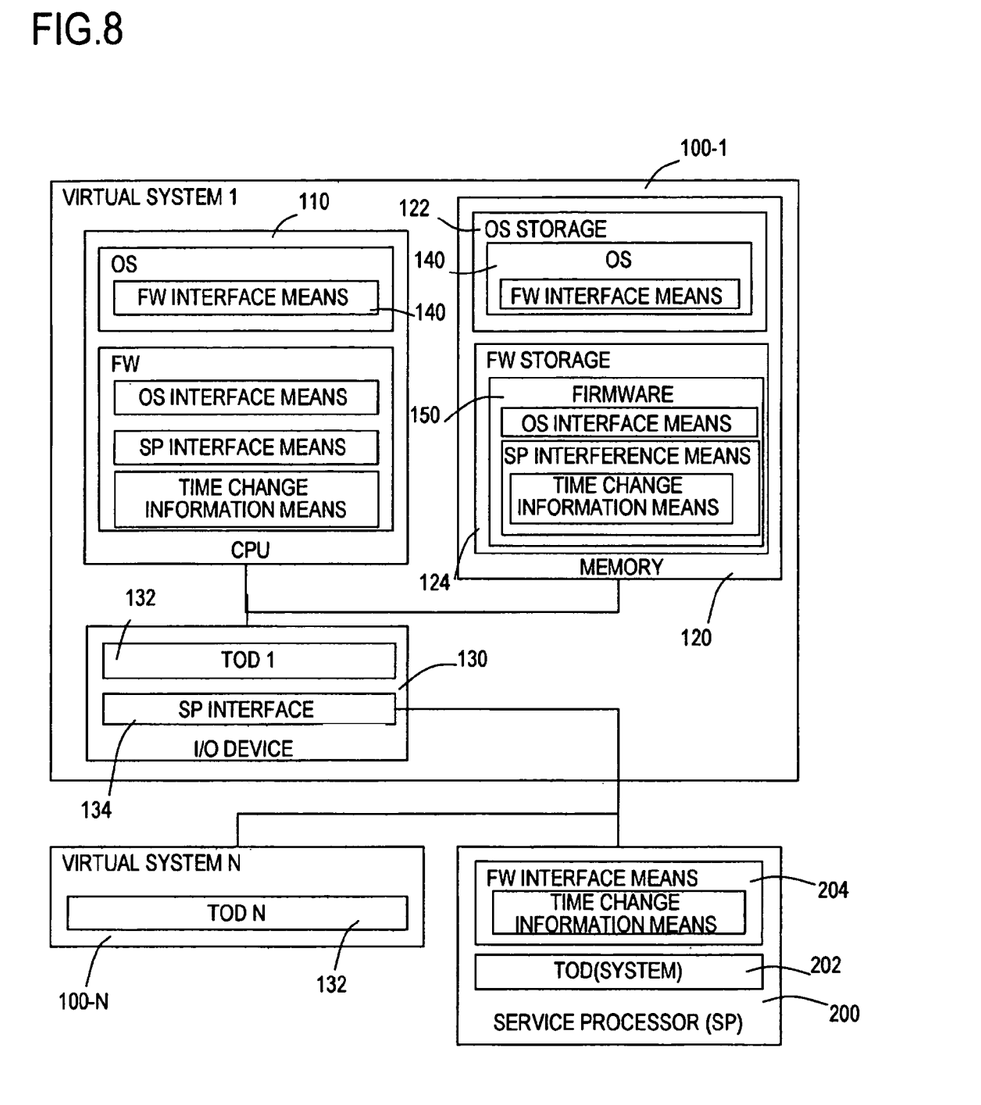
FIG. 8 is a configuration diagram of a computer system in the prior art.
Figure 9:
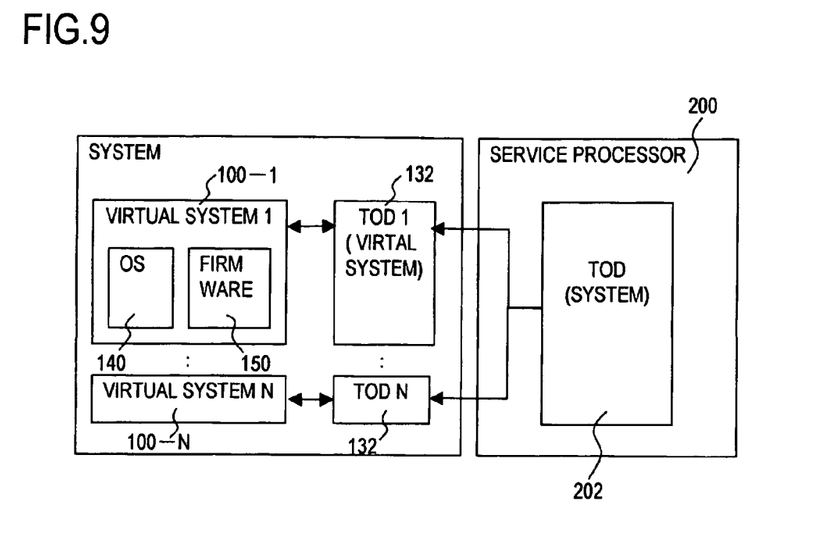
FIG. 9 is a block diagram of the time management mechanism in the prior art.
Figure 10:
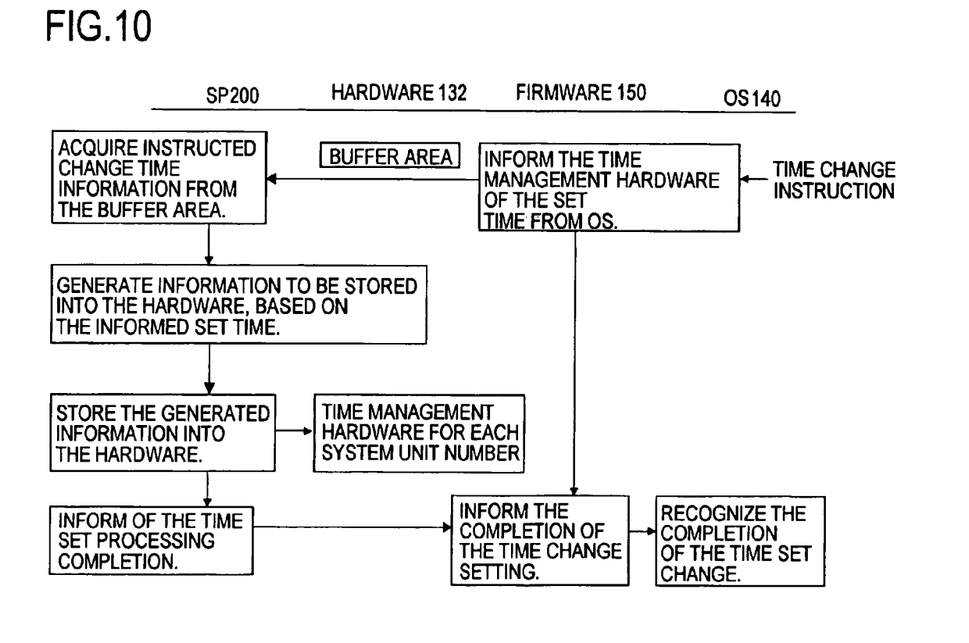
FIG. 10 is a flow chart of the time charge processing in the prior art.

FIG. 8 is the conventional computer system configuration, FIG. 9 is an explanation diagram of the system time management thereof, and FIG. 10 is an explanation diagram of system time change processing. As shown in FIG. 8, the large-scale system includes N pieces of virtual systems 100-1-100-N, and a service processor 200. Each virtual system 100-1-100-N includes one or a plurality of CPUs 110, one or a plurality of memories 120, and I/O devices 130. A memory 120 stores OS (Operating System) 140 in an OS storage area 122, and also stores firmware 150 in a firmware storage area 124.

The OS 140 includes a firmware interface means (program), and the firmware 150 includes OS interface means (program), SP interface means (program) and time change information means (program).

The CPU 110 performs desired processing through the execution of the above OS 140 and firmware 150. The I/O device 130 is connected to the service processor 200, and includes a TOD 132, which plays the role of a clock timer, and an SP interface means (program) 134, as an example. The TOD 132 is constituted of an on volatile memory and a counter, and can retain a time even in case that the power is off.

The service processor 200 includes a TOD 202 which plays the role of a clock timer of the system, and an FW interface means (program) 204 having a time change information means.

In such a configuration, changing the time in the virtual system is carried out when executing an inspection test by performing some processing after setting the time to the past or to the future, and simulating a switch over of a computer, or the like.

Referring to FIGS. 9 and 10, the conventional time management method will be explained. First, the OS 140 provides a time change instruction to the firmware 150. The firmware 150 informs the TOD 132, which is time management hardware, of a set time (on the basis of a lapse of time) from the OS 140. The time management hardware 132 stores the above set time into a buffer area, and informs the service processor 200 of the change of time through the SP interface 134.

The service processor 200 acquires the instructed change time information from the buffer area of the time management hardware 132, and calculates a differential time with the change time based on a system time, by means of system time management hardware 202 of the overall system. The above differential time is written into the time management hardware 132 of the virtual system. On receipt thereof, the time management hardware 132 calculates the change time. Also, after writing, the service processor 200 informs the firmware 150 of the completion of time change setting, and the firmware 150 transfers the above information to the OS 140.

As such, conventionally, the service processor 200 calculates a differential time (New-time) between the time of the virtual system and a planned change time, sets the differential time into a memory area of the time management hardware 132 in the virtual system, and hardware calculates a time (for example, refer to Patent documents 1 and 2).

Patent document 1: The official gazette of the Japanese Unexamined Patent Publication No. Hei-11-015558.
Patent document 2: The official gazette of the Japanese Unexamined Patent Publication No. 2004-318878.

DISCLOSURE OF THE INVENTION

Problems to be Solved by the Invention

Such the conventional configuration has been targeted at a small-scale system. However, in a large-scale system, it is necessary to provide the time management hardware TOD 132 in every virtual system. If the number of system units increases, massive hardware becomes necessary, which is a cause of cost increase.

Further, because calculation processing is required in the service processor, when the service processor is executing other processing of higher priority, the time setting to the memory area in the time management hardware is delayed, and an error may occur in the time actually set.

Accordingly, it is an object of the present invention to provide a time management method of a computer system, and to provide a computer system, with a reduced number of the time management hardware even when a large number of virtual systems are implemented.

Further, it is an object of the present invention to provide a time management method of a computer system, and to provide a computer system, preventing cost increase by reducing the number of time management hardware even when a large number of virtual systems are implemented.

It is another object of the present invention to provide a time management method of a computer system, and to provide a computer system, preventing a time change delay even when a large number of virtual systems are implemented.

Means to Solve the Problems

In order to achieve the aforementioned objects, according to the present invention, there is provided a time management control method of a computer system for managing individual time of a plurality of virtual systems. The method includes a step of acquiring a time of an overall system and a difference between the time of the overall system and a time of the virtual system retained in a service processor, by means of firmware in the virtual system; according to a time change instruction, a step of calculating by the firmware the difference between the time of the overall system and a change time of the virtual system, adding the both differences, and informing the service processor of the added result; and a step of updating the difference of the virtual system retained in the service processor, using the informed added result.

Further, according to the present invention, a computer system includes a plurality of virtual systems; and a service processor retaining a time of an overall system and a difference between the time of the overall system and a time of the virtual system. The above virtual system acquires the time of the overall system and the difference from the service processor, and according to a time change instruction, calculates a difference between the time of the overall system and a change time of the virtual system, adds the both differences, and informs the service processor of the added result. Further, the above service processor updates the retained difference of the virtual system, using the informed added result.

Further, according to the present invention, preferably, the above acquisition step includes a step of acquiring the difference corresponding to the virtual system from the difference of each virtual system retained in the service processor, by means of firmware in the virtual system.

Effect of the Invention

The service processor retains the difference between the time of the overall system and the time of the virtual system for every virtual system, and firmware in the virtual system acquires the time of the overall system time and the difference between the time of the overall system and the time of the virtual system, calculates the difference between the time of overall system and the change time, adds the both differences, and informs the service processor. Accordingly, the time of the virtual system can be changed without time management hardware in each virtual system. Further, since the service processor performs update processing only, it is also possible to prevent a time setting error caused by a delay in calculation processing etc. Further scopes and features of the present invention will become more apparent by the following description of the embodiments with the accompanied drawings.

PREFERRED EMBODIMENTS OF THE INVENTION

Hereafter, the present invention is described with reference to the charts and drawings, in order of a computer system, time change control, and other embodiments. However, it is noted that the scope of the present invention is not limited to the embodiments described below, but a variety of deformations are possible.

[Computer System]

Figure 1:
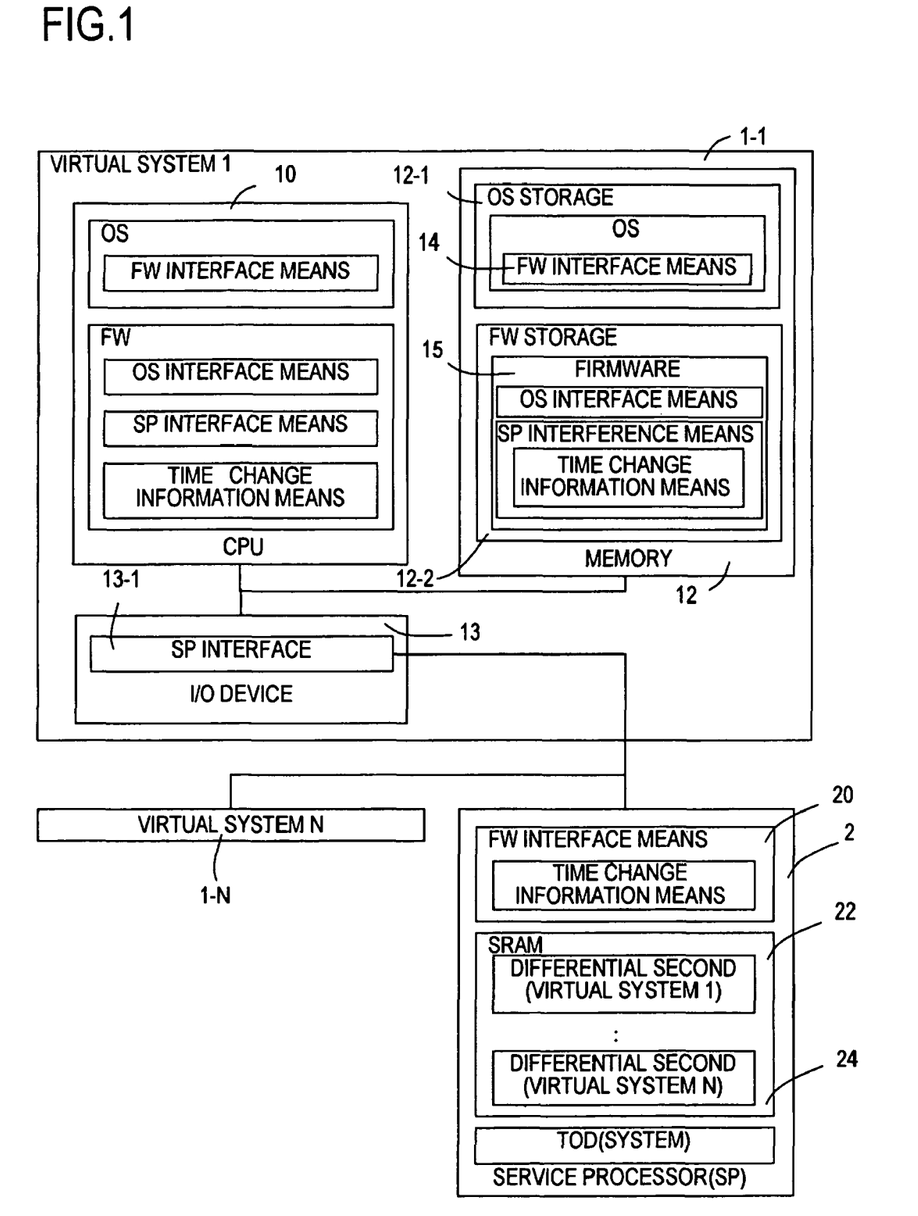
FIG. 1 is a configuration diagram of a computer system according to the present invention.

FIG. 1 is a configuration diagram of a computer system according to one embodiment of the present invention. As shown in FIG. 1, a large-scale system includes N pieces of virtual systems 1-1-1-N, and a service processor 2. Each virtual system 1-1-1-N includes one or a plurality of CPUs 10, one or a plurality of memories 12, and I/O devices 13. The memory 12 stores OS (Operating System) 14 in an OS storage area 12-1, and firmware 15 in a firmware storage area 12-2.

The OS 14 includes a firmware interface means (program), and the firmware 15 includes OS interface means (program), SP interface means (program), and time change information means (program).

The CPU 10 performs desired processing by executing the above OS 14 and firmware 15. The I/O device 13 includes SP interface means (program) 13-1 which is connected to the service processor 2.

The service processor 2 includes a time management hardware TOD 24 which plays the role of clock timer of the system, an FW interface means (program) 20 having the time change information means, and an SRAM (memory) 22 for storing a differential second between each virtual system.

A major difference between the prior art shown in FIG. 8 and the embodiment of the present invention shown in FIG. 1 is that only the service processor 2 has time management hardware 24 according to the embodiment shown in FIG. 1, in contrast that each virtual system in FIG. 8 has the time management hardware 132. Also, in the service processor 2 shown in FIG. 1, SRAM (volatile memory) 22 is mounted and for storing each differential second between each virtual system 1-1-1-N. Here, the time management hardware TOD is hardware which plays the role of a clock timer, retains date and time values in a plurality of counters, and has such a mechanism that an upper-level counter is increased when an individual counter reaches a maximum value.

Further, the firmware signifies firmware for generating device tree information and booting the OS, which is called the OpenBoot PROM.

The FW interface means is an interface existent to issue an instruction from the OS 14 to the firmware 15. What is provided in the service processor 2 represents an interface being prepared for exchanging information with the firmware from the service processor 2.

The OS interface means is an interface for exchanging information with the OS 14 from the firmware 15. The real substance of the hardware is identical to the FW interface, which is referred to as OS interface means, to enable discrimination. The SP interface means is an interface existent to issue an instruction from the firmware 15 to the service processor 2.

Namely, a memory area 22 is prepared for preserving a time on the basis of each virtual system unit. In the above memory area 22, there are preserved a differential time (Domain-time) between times of each individual virtual system and the time of the overall system processed by time management hardware 24 mounted on the service processor 2.

When the virtual system 1-1 changes a time setting of the self, the above change is performed by changing the differential time of the self-virtual system preserved in the memory area 22 of the service processor 2. The change of the differential time is performed by procedures that the OS 14 mainly instructs to the firmware 15 and the firmware 15 issues a command to request the service processor 2 to change the time. Here, as information to be transferred to the service processor 2 by the above command, a differential time (Set-time) between the time of the overall system and a planned change time is transferred.

[Time Change Processing]

Figure 2:
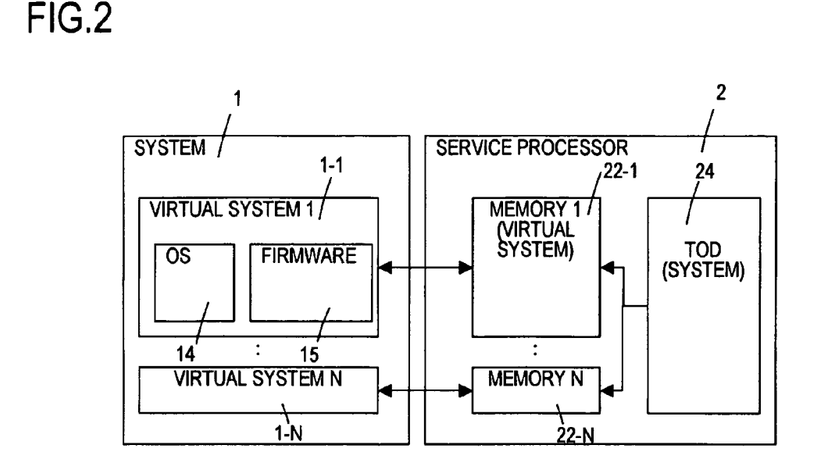
FIG. 2 is a block diagram of the time management mechanism in FIG. 1.
Figure 3:
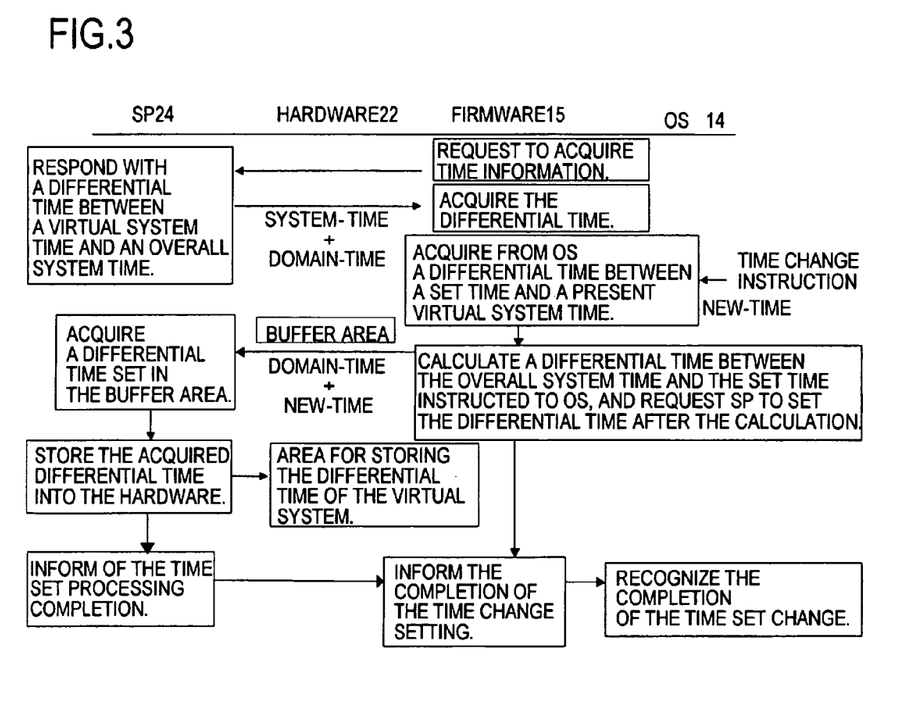
FIG. 3 is a flow chart of the time charge processing of FIG. 2.

FIG. 2 is an explanation diagram of the time change processing in FIG. 1, and FIG. 3 is a time change processing flowchart in FIG. 2.

The time change processing shown in FIG. 3 will be explained with reference to FIG. 2.

(1) At the time of starting up the virtual system 1-1, the firmware 15 issues a command to the service processor 2 to acquire a present time. By the above command issue, the firmware 15 acquires a time of an overall system (which is referred to as System-time) and a differential time (which is referred to as Domain-time) between a time of a virtual system and the time of the overall system.

(2) When it becomes necessary to change the management time of the virtual system 1-1, the OS 14 issues a time change command to the firmware 15. At this time, through the command, a differential time (which is referred to as New-time) between a planned change time and the present time of the virtual system is transferred to the firmware 15.

(3) On receiving the command issued from the OS 14, the firmware 15 calculates a time (Domain-time+New-time) to be transferred to the service processor 2 when requesting the time change thereto.

(4) The firmware 15 transfers to the service processor 2 the time (Domain-time+New-time) calculated in (3), through the time change command.

(5) The service processor 2 sets the time transferred in (4) into a memory area 22-1 which has stored the differential time of the virtual system 1-1.

(6) After the setting, the service processor 2 informs the firmware 15 of the completion of time set processing, and then the firmware 15 informs the OS 14 of the completion of the time set processing.

As such, the service processor 2 retains the difference between the time of the overall system and the time of the virtual system on the basis of each virtual system, and the firmware 15 in the virtual system 1-1 acquires the time of the overall system and the difference between the time of the overall system and the time of the virtual system, calculates the difference between the time of the overall system and the time of the virtual system, adds the both differences, and informs this the service processor 2.

Thus, it is possible to change the time of the virtual system without time management hardware in each virtual system. Further, since the service processor 2 performs update processing only, it is possible to prevent an error in time setting caused by delayed calculation processing etc.

Figure 4:
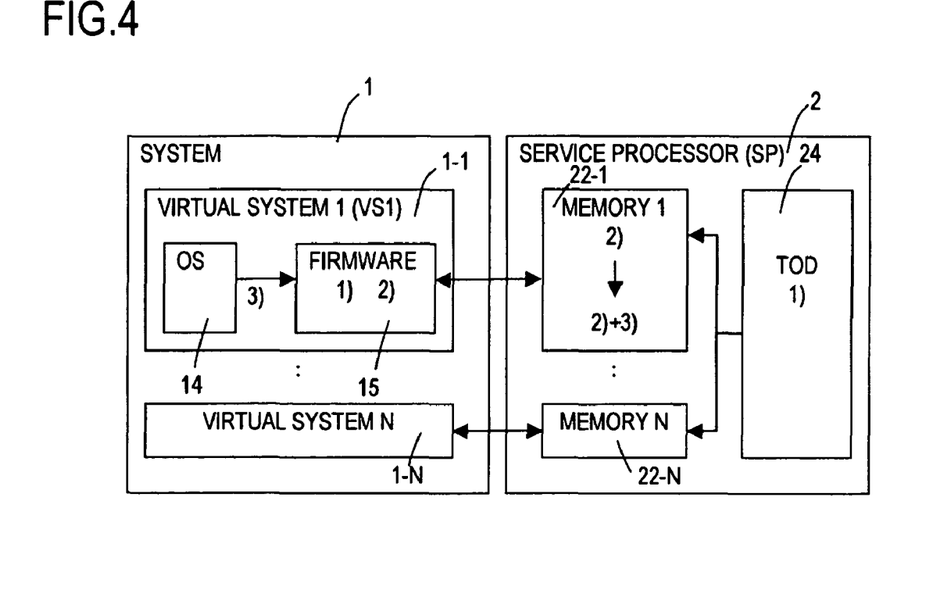
FIG. 4 is an explanatory diagram of an exemplary case when charging the virtual system time to the future relative to the present time shown in FIG. 2.
Figure 5:
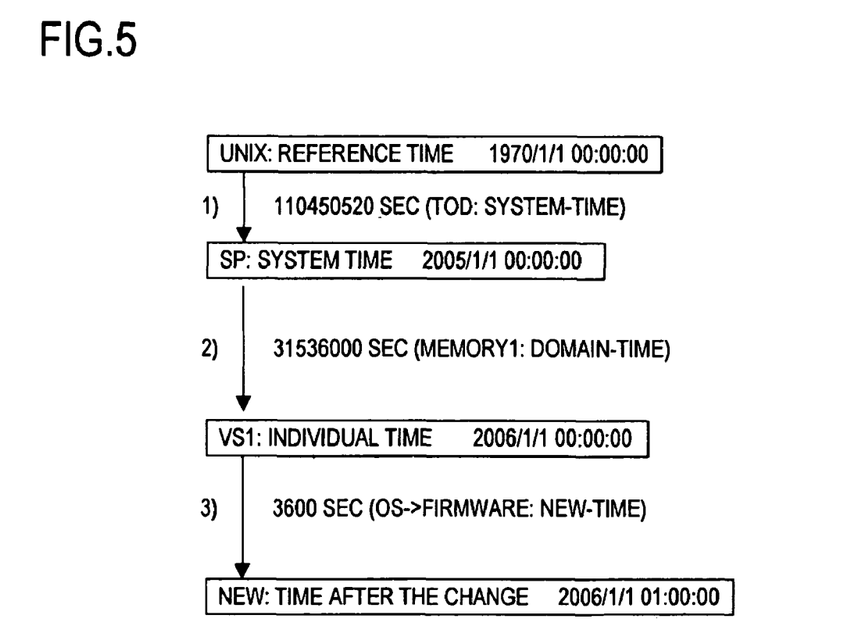
FIG. 5 is an example of an exemplary case when charging virtual system time to the future relative to the present time shown in FIG. 2.

FIGS. 4 and 5 are explanation diagrams of an exemplary case when changing the time of the virtual system to the future relative to the present time. The example of FIG. 5 will be explained with reference to FIG. 4.

As shown in FIG. 5, the system time is a time difference (1) between a UNIX reference time (UNIX is a registered trademark) (here, Jan. 1, 1970 00:00:00) and a system time (here, Jan. 1, 2005 00:00:00) managed by the time management hardware 24 of the service processor 2. The domain time is a time difference (2) between the system time of the service processor 2 and an individual time of virtual system 1-1 (here, Jan. 1, 2006 00:00:00).

The time management hardware 24 in the service processor 2 has the system time (1), and retains the domain time in the memory area 22-1 of the memory 22.

First, the firmware 15 in the virtual system 1-1 has the system time (1) acquired from the service processor 2, and the domain time (2).

The OS 14 informs the firmware 15 of a differential second, New-time (3), between the time after the change and the present time of the virtual system. The firmware 15 informs the service processor 2 of an added value of the domain time (2) to the New-time (3). The service processor 2 preserves the value (2)+(3) informed from the firmware 15 in the memory 22-1. In the above manner, the change of time is performed.

Figure 6:
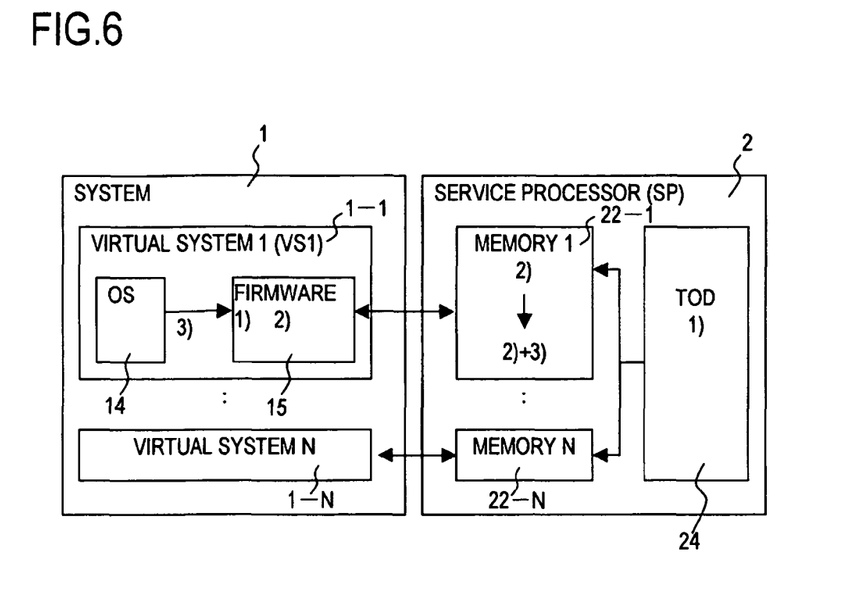
FIG. 6 is an explanatory diagram in an exemplary case of changing a virtual system time to the past relative to the present time shown in FIG. 2.
Figure 7:
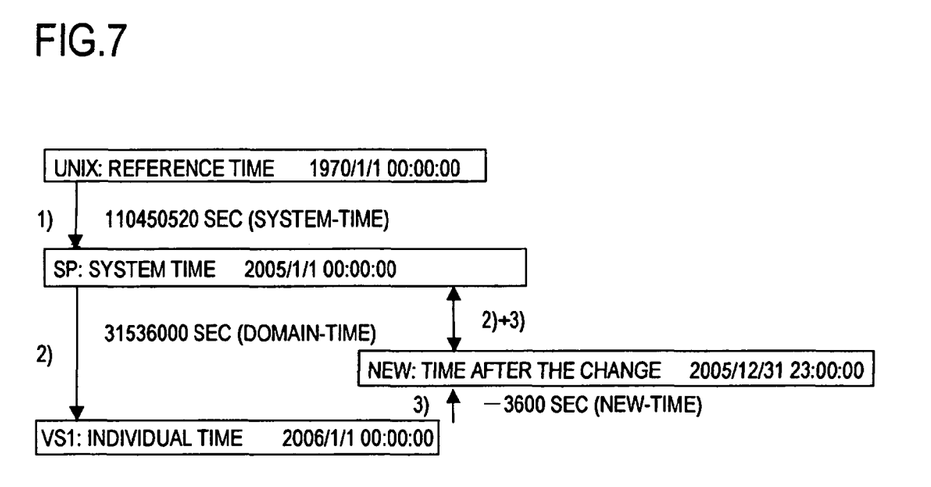
FIG. 7 is an explanatory diagram of an example in an exemplary case of changing a virtual system time to the past relative to the present time shown in FIG. 2.

FIGS. 6 and 7 are explanation diagrams in an exemplary case of changing a virtual system time to the past relative to the present time. The example shown in FIG. 7 will be explained with reference to FIG. 6.

In FIG. 7, a system time (1) and a domain time (2) are defined, similar to FIG. 5. First, the firmware 15 in the virtual system 1-1 has the system time (1) acquired from the service processor 2, and the domain time (2).

The OS 14 informs the firmware 15 of a differential second, New-time (3), (−3,600 seconds) between the time after the change and the present time of the virtual system. The firmware 15 informs the service processor 2 of an added value of the domain time (2) to the New-time (3). The service processor 2 preserves the value (2)+(3) informed from the firmware 15 in the memory 22-1. In the above manner, the change of time is performed.

Other Embodiments

Although the explanation has been made taking UNIX (registered trademark) as an example in the above explanation, other configurations may be possible. Also, the number of virtual systems is arbitrary, as long as the number is plural.

The service processor 2 retains the difference between the overall system time and the virtual system time for every virtual system, and the firmware 15 in the virtual system 1-1 acquires the overall system time and the difference between the overall system time and the virtual system time, calculates the difference between the overall system time and the change time, adds the both differences, informs this the service processor 2.

Accordingly, the virtual system time can be changed without time management hardware in each virtual system. Further, since the service processor 2 performs update processing only, it is also possible to prevent a time set error caused by delayed calculation processing etc. The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A time management method of a computer system for managing each individual time of a plurality of virtual systems, the time management method comprising:
    acquiring a time of an overall computer system in a time management hardware of a service processor connected to the plurality of virtual system and a first difference time between the time of the overall system and a time of the virtual system retained in a memory of the service processor, by firmware in the virtual system, to set the individual time when starting the virtual system;
    calculating by the firmware a second difference time between a present time of the virtual system and a change time of the virtual system according to a time change instruction of the virtual system;
        adding the second difference times to the first difference time;
        informing added times to the service processor; and
    updating the first difference time of the virtual system retained in the memory of the service processor, using the informed the added time.

2. The time management method of the computer system according to claim 1,
wherein the acquiring includes a process of acquiring the first difference time corresponding to the virtual system from the first difference time of each virtual system retained in the memory of the service processor, by the firmware in the virtual system.

3. A computer system comprising:
a plurality of virtual systems, each virtual system is operated in an individual time; and
a service processor connected to each of the virtual systems, the service processor comprising:
    a time management hardware that counts a time of an overall computer system; and
    a memory that stores a first difference time between the time of the overall computer system and an individual time of one of the plurality of virtual systems,
wherein the virtual system, when the virtual system is started, acquires the time of the overall computer system and the first difference time of the virtual system from the service processor to set the individual time, and calculates a second difference time between a present time of the virtual system and a change time of the virtual system according to a time change instruction of the virtual system, adds the both difference times, and informs added time to the service processor,
and wherein the service processor updates the first difference time of the virtual system in the memory, using the informed added time.

4. The computer system according to claim 3,
wherein the virtual system acquires the first difference time corresponding to the virtual system from the first difference times of each virtual system retained in the memory of the service processor.

* * * * *